United States Patent Office
3,674,508
Patented July 4, 1972

3,674,508
PRODUCTION OF CHEESE FLAVOR
Robert L. Kasik, Oak Lawn, and Anthony J. Luksas, Chicago, Ill., assignors to Beatrice Foods Co., Chicago, Ill.
No Drawing. Filed May 13, 1969, Ser. No. 824,250
Int. Cl. A23c *19/02, 19/12;* A23l *1/26*
U.S. Cl. 99—140 R
34 Claims

ABSTRACT OF THE DISCLOSURE

A basic cheese flavor or a cheddar cheese flavor is produced in a short time by growing a combination of one member of the genus Bacillus and one member of the genus Streptococcus in an aqueous medium containing a protein and a carbohydrate.

---

The present invention relates to the production of a cheese flavor and cheese flavored products. More particularly, the present invention relates to a method and composition for the production of a basic cheese flavor, especially a cheese flavor for producing cheese and products such as cheddar cheese and cheese products.

Cheese is widely used by the consumer in many forms. For example, cheese itself is consumed as an end product, but also cheese or cheese flavors may be in a dried form or contained in salad dressing, dips, sauces and the like. Due to the wide consumer acceptance of cheese flavors, there is a great demand for such products. However, cheese is a relatively expensive product due mostly to the long processing time required to produce the cheese and develop the distinctive flavors. Under the circumstances, it would be highly desirable to accelerate the production of cheese and the development of the cheese flavors so that cheese or cheese flavored products could be manufactured in a much shorter time and thereby decreasing the cost thereof.

Accordingly, it is an object of this invention to provide a method of producing a cheese flavor and cheese flavored products which requires considerably less time than the normal production methods. It is a further object of this invention to provide a composition for the production of a cheese flavor, which composition will allow the development of cheese flavors in a relatively short time. Other objects will be apparent from the following disclosure and claims.

A common method of producing cheese is that of heating milk to an elevated temperature below the sterility point, cooling the milk, causing the milk to form curds, separating the curds from the whey, pressing the curds into a mass and allowing the mass to age for some extended time in order to develop the cheese flavor. This process has been used for producing cheeses for centuries and the exact mechanism by which the flavors are developed has never been fully explained. It has been assumed in the art that various organisms present or introduced during the cheese making process slowly produce the various cheese flavors. However, as is also known in the art, there are a host of various organisms in milk, both the organisms naturally occurring in the milk and the organisms which are present due to contamination.

The present invention is in part based on the discovery of particular organisms which are responsible for the development of a basic cheese flavor. This discovery has allowed the isolation of these organisms and the growth thereof under conditions favorable for their rapid development. The organisms can thus be grown in a relatively short time with the development of a cheese flavor. According to the invention a composition is provided which will allow a rapid development of these organisms and this composition may be used to produce various cheese flavors directly or as an inoculant for the production of various cheese flavors from another source.

Briefly stated, it has been discovered that a cheese flavor may be rapidly developed in a composition comprising an aqueous medium having at least one protein and at least one carbohydrate therein and wherein the medium contains at least ten organisms per gram of the medium of at least one member of the genus Bacillus and at least ten organisms per gram of the medium of at least one member from the genus Streptococcus. It has unexpectedly been found that when a member from the genus Bacillus and the genus Streptococcus are contained in a medium which will support their growth at a reasonable rate, a cheese flavor will rapidly develop. As noted above, the organisms must be contained in a medium which will support their rapid growth and this medium must contain a protein and a carbohydrate. The proteins which may be utilized by the organisms are not critical and may be, for example, animal proteins, e.g. milk, or vegetable proteins, e.g. soy bean protein, and like vegetable proteins. The organisms are non-sensitive to the particular protein and carbohydrate. Likewise the particular percentage of protein and carbohydrate in the aqueous medium is not critical, but from .5 gram of protein per 100 grams of aqueous medium and from .5 gram of carbohydrate per 100 grams of aqueous medium to 35 grams of protein and 35 grams of carbohydrate per 100 grams of aqueous medium are suitable, especially 1 gram of protein and 1 gram of carbohydrate to 7.5 grams of protein and 5.5 grams of carbohydrate. Milk itself provides quite suitable proteins and carbohydrates in the above ranges and is, therefore, a suitable medium for growing the organisms in the present composition. However, it is not necessary to use only milk, since other milk fractions or products may be used, for example, cream, whole milk, skim milk, milk solids (total milk solids or non-fat milk solids and like fractions or products).

Any member of the genus Bacillus may be used according to the present invention. For example, the organisms of the genus which may be used are *Bacillus abortivo-equinus, abortivus, abortivus equinus, abortus, abortus equi, abortus equinus, acidilactici, acidi propionici, acidi urici, acidophilus, acnes, actinoides, adenitis equi, aegyptius, aerofoetidus, aerogenes, aerogenes capsulatus, alkalescens,* α, *alvei, ambiguus, anaerobicus, anaerobicus caproicus, anaerobicus minutus, anaerobius chromogenes, anthracis, aquatilis, aroideae, aromaticus lactis, aterrimus, atrosepticus, aurogenus, badius, belfantii, biazoteus, bifermentans, bifermentans sporogenes, bifidus, bifidus communis, bookeri, botulinus, brevis, bronchicanis, bronchisepticus, brunneu, brunneus rigensis, buchneri, bulgaricus, bullosus, cadaveris, cadaveris sporogenes, cadaveris sporogenes (anaerobicus), campestris, canalis parvus, capillosus, capitovalis, carnis, carotovorus, casei* α *(alpha), casei* ε *(epsion), casei* γ *(gamma), caucasicus, caudatus, cellaseus, cellulosae dissolvens, cellulosam fermentans, cereus, cercus var. mycoides, ceylanensis B, chitinovorus, chlororaphis, circulans, citrimaculans, cloacae, coagulans, cochlearius, cohaerens, coli, coli communior, columnaris, delbruckii, delicatulus, delphinii, denitrificans fluorescens, denitrificans II, devorans, diaphthirus, difficilis, diffusus, diphtheriae, diphtheriae vitulorum, discoformans, dispar, dormitator, duplex, dysenteriae, emphysematosus, enteritidis, enzymicus, equirulis, equuli, escherichii, extorquens, faecalis alcaligenes, fairmontensis, fallax, felsineus, firmus, flavidus, flavigena, floccosus, fluorescens convexus, fluorescens incognitus, fluorescens liquefaciens, fluorescens non liquefaciens, fluorescens ovalis,* fluorescens putidus, fluorescens schuylkilliensis, fluorescens septicus, foedans, fragilis, fulvus, funduliformis, furcosus, fuscus, fusiformis, galbus, gallinarum, γ (gamma), gelaticus, gelidus, geniculatus, gigas, glutinosus, gonidiaformans, gracilis ethylicus, gracilis putidus, guttatus, haemoglobinophilus canis, halobius ruber, hastilis, haumani, helminthoides, helvolus, hemoglobinophilus coryzae gallinarum, hemolyticus, histolyticus, hoagii, hydrophilus, hydrophilus fuscus, inconstans, indicus, influenzaeformis, insidiosus, invisibilis, lactis acidi, lactis harrisonii, lactis niger, lactis No. 1, lactis viscosus, lacunatus, larvae, laterosporus, leichmanni I, lentimorbus, lentus, leprae, licheniformis, liquefaciens, liquefaciens pyogenes bovis, liquidus, macerans, mallei, manihotus, megaterium, megatherium, membranaceus amethystinus, methanicus, milletiae, moniliformis, morgani, mortiferus, mucosus ozaenae, multifermentans tenalbus, multiformis, mycoides, mycoides corallinus, neapolitanus, necrogenes, necrophorus, necroticus, nephritidis equi, niger, nitrogenes, novyi, ochracevus oedematis maligni No. II, oedematis thermophilus, oligocarbophilus, omelianskii, osteomyelitis bubalorum, ozaenae, pantothenicus, pantothenticus, pantotrophus, paradysenteriae, para-pertussis, paraputrificus, paratyphi abortus ovis, paratyphi alcaligenes, paratyphosus, parvus liquefaciens, pasteurii, perfringens, pestifer, phaseoli, phlegmones emphysematosae, phosphorescens, pierantonii, pneumoniae, poeciloides, polymyxa, popilliae, pseudodiphtheria, pseudomallei, pseudoramosus, pseudotetanus, Type No. IX, pseudotuberculosis, pseudotuberculosis murium, pseudotuberkulosis, pulvifaciens, pumilus, punctatus, pusilus, putidus, putredinis, putrefaciens, pyocyaneus,, pyocyaneus saccharum, pyogenes, pyogenes anaerobius, ramosoides, ramosus, regularis filiformis, renalis bovis, rhenanus, ruber balticus, rubropertinctus, rugosus, saccharobutyricus, saprogenes, saprogenes, carnis, schottmuelleri, septicaemiae anserum, exsudativae, septicaemiae haemorrhagicae, septicus, serpens, shigae, smaragdinus foetidus, smegmatis, solanacearum, sphaericus, sphenoides, stearothermophilus, striatus albus, striatus flavus, striatus viridis, subterminalis, subtilis, subtilis var. aterrimus, subtilis var. niger, superficialis, tenuis spatuliformis, terebrans, tertius, tetani, tetanoides (A), tetanomorphus, thetaiotaomicron, thetoides, thuringiensis, tortuosus, tracheiphilus, trichoides, tuberculosis, tuberculosis gallinarum, tuberculosis ovis, typhi, typhi adbominalis, typhi murium, typhosus, ulceris cancrosi, variabilis, variegatus, vascularum, venturelli, vitivora, welchii, whitmori.

Likewise, any member of the genus Streptococcus may be used. For example, the organisms: *Streptococcus acidominimus, agalactiae, agalactiae contagiosae, anaerobius, anaerobius micros, anginosus, bovis, citrovorus, cremoris, durans, dysgalactiae, epidemicus, equi, equinus, equisimilis, erysipelatos, evolutus, faecalis, faecalis* var. *liquefaciens, faecalis* var. *zymogenes, foetidus, hemolyticus, hollandicus, intermedius, intracellularis, lactis* B, *lanceolatus, mastitidis,* MG, *micros,* Miletensis *mitis, nocardi, ovalis, parvulus, parvulus non liquefaciens, productus, pseudoagalactiae, putridus, pyogenes, pyogenes, animalis, salivarius, sanguis, scarlatinae,* Schwarzenbeck, *thermophilus, uberis, zooepidemicus, zymogenes.*

The genus Bacillus are characterized as rod-shaped cells, sometimes in chains, capable of producing endospores. Sporangia do not differ from the vegetative cells except when bulged by spores larger than the cell diameter; such sporangia are spindle-shaped when the spores are central and wedge- or drumstick-shaped when the spores are terminal. Motility is by means of *Peritrichous flagella* or they may be non-motile. The organisms are generally gram-positive, but some species may be gram-variable or gram-negative. Some species usually occur in the rough stage, forming a pellicle on broth, whereas other species are smooth and the rough stage is rarely seen. Usually proteins are decomposed with the production of ammonia. Carbohydrates are generally fermented with the production of more or less acidity; a few also produce visible gas. The organisms are catalase-positive, and are aerobic or facultatively anaerobic. Maximum temperatures for growth vary greatly, not only between species but also between strains of the same species. Variations in other characters frequently occur within a species. The organisms are mostly saprophytes, commonly found in soil; a few are animal, especially insect. parasites or pathogens.

The genus Streptococceae are generally spherical or elongate, dividing in one plane only, usually occurring in pairs or in chains. Gelatin is rarely liquefied by the organisms. None of the species grows abundantly on solid media. The microaerophilic species attack carbohydrates and polyhydroxy alcohols, producing lactic acid by homofermentation or lactic and acetic acids, alcohol and carbon dioxide by heterofermentation; the strictly anaerobic species attack protein decomposition products, organic acids and usually carbohydrates with the production of carbon dioxide, hydrogen, and other products. The organisms are microaerophilic to anaerobic, and catalase-negative. They may or may not be pathogenic; some pathoegnic species grow poorly without blood serum or other enrichment fluids. They are found in various lesions and in the normal mouths and intestines of man and other animals, in food and dairy products and in fermenting plant juices.

More information concerning the organisms of the present invention may be found in "Bergey's Manual of Determinative Bacteriology," Breed, Murray and Smith, Seventh Edition, the Williams & Wilkins Company, Baltimore, Md., 1957, at pages 506, 507, 510, 511, 613 and 614, which disclosures are hereby incorporated by reference. These genera are well recognized in the art and have been studied in some detail. Accordingly, the details of these genera will not be repeated in this specification since one skilled in the art is well aware of the genera.

While any member of the genus Bacillus and the genus Streptococcus may be used in the present composition and method to produce a cheese flavor, some of the organisms are toxic or produce toxins which, of course, would be unsuitable for consumption; accordingly, for the purposes of the present specification, the toxic organisms and the oragnisms which produce toxins are excluded from the present composition and method. Accordingly, the present invention is directed only to the non-pathogenic species of the genera Bacillus and Streptococcus. In regard to the genus Bacillus, the organisms which are pathogenic are known to the art and include, for example, *B. anthracis, B. thuringiensis, B. licheniformis, B. larvae, B. popilliae, B. lentimorbus.*

Also as is known to the art, Group 1 and Group 3a of the genus Streptococcus are pathogenic. Accordingly, for the purpose of the present specification, the genus Streptococcus is limited to Group 2, the Enterococcus Group of Group 3, and Group 4. For further information characterizing and the keys to the species of the genera above, see "Bergey's Manual" noted above.

It has also been found that while the combination of at least one member from the genus Bacillus and the genus Streptococcus will produce a cheese flavor, the degree and distinctiveness of the flavor developed varies with the particular members chosen. In other words by choosing a particular member or members from each of the two groups various specific cheese flavors and varying degrees and distinctiveness of a cheese flavor can be obtained. Hence, certain combinations of the organisms from the genus Bacillus and genus Streptococcus will produce a cheddar cheese flavor or varying distinctiveness, in addition to the basic cheese flavor of the invention. For example, if it is desired to product a high degree and distinctiveness of a cheddar cheese flavor, the organisms which have been found best for this purpose, from the genus Bacillus, are *alvei, cereus, cereus* var. *mycoides, megaterium, megatherium, subtilis, subtilis* var. *aterrimus,*

*subtilis* var. *niger*, and from the genus Streptococcus are *cremoris, durans, faecalis, lactis*. Also within this group, a certain combination produces quite superior results in terms of the degree and distinctiveness of the cheddar flavor developed. Accordingly, this combination is considered to be a best mode of the present invention, especially since a specific cheese flavor as well as a basic cheese flavor is produced. The combination is the organisms megaterium and megatherium from the genus Bacillus and the organisms *S. lactis variation diacetilactis* (citrate fermenter) and *S. lactis-diacetilactis* (citrate non-fermenter) from the geus streptococcus.

However, when any members of the genus Bacillus and the genus Streptococcus are used to produce a cheese flavor, as described above, the resulting product is a basic cheese flavor and not necessarily a cheddar cheese flavor, unless the particular organisms noted in connection with cheddar cheese are particularly used. The basic cheese flavor produced according to the broader aspects of this invention is characterized by the cheesy flavor which is common to all cheeses. As will be appreciated by those skilled in the art, all cheeses have a cheesy flavor which is essentially universal with cheeses. The particular cheeses commonly consumed have additional flavors superimposed upon this basic cheesy flavor and these flavors give rise to the particular cheeses such as blue cheese, cheddar cheese, Swiss cheese, Romano cheese, etc. Hence, as is apparent from the above, in the broader aspects of the invention the composition can be used for providing a basic cheesy flavor to which is added the additional specific cheese flavor normally associated with particular cheeses and cheese products. The particular cheese flavors are not at all critical and may be, for example, a blue cheese flavor, a cheddar cheese flavor, an Italian cheese flavor, a Swiss cheese flavor, etc. or the natural cheeses may be added to the composition of the present invention in various proportions to produce a flavored cheese product.

As noted above, the cheese or cheese flavor may be produced directly from a composition or a composition may be prepared for inoculating a medium for producing the cheese or cheese flavor. Also as noted above, the protein and carbohydrates may be chosen as desired, but it is most convenient to use milk, a milk fraction or a milk product in the present process. In this regard, skim milk is quite suitable as a medium for the present composition and process. The milk medium must have not less than 4% and not greater than 35% total solids, the remainder being essentially water and the dissolved natural constituents of milk. This medium is heated from at least 145° F. for 30 minutes, i.e. pasteurization, to 295° F. for 15 seconds, or to sterility at any temperature and time, which processes are well known in the art. It has been discovered that when the medium is heated to within such temperature and time ranges the organisms occurring in the medium will be substantially killed or retarded to a point that they are prevented from competing with the organisms of the present invention. Under the circumstances, the heating step is quite critical. The medium is then cooled to 130° F. or below and preferably below 100° F. The medium however must be maintained above 60° F. and preferably above 85° F. While the medium is maintained within the above-noted temperature range, it is inoculated with at least ten organisms of the genus Bacillus and at least ten organisms of the genus Streptococcus per gram of medium. More preferably, at least 100 organisms of each genus are placed in the medium and for best results at least 1000, e.g., 10,000 or more organisms of each genus are placed in the medium. While the ratio of the organisms from the genus Bacillus and the genus Streptococcus is not narrowly critical, it is preferred that the ratio be between 25:75 to 75:25 (Bacillus to Streptococcus). Preferably the media with the inoculant therein are stirred sufficiently to distribute the organisms throughout the media. The stirring is, however, not critical since the organisms will naturally distribute throughout the media within a reasonable amount of time. The inoculated medium is then sealed in an airtight manner, e.g., by capping or the like and maintained within the above-noted temperature range for 3 to 5 days during which a fermentation process takes place. Of course, if desired, longer times may be used, but it has been found that the growth of the organisms tapers off considerably after five days and very little advantage can be obtained in allowing the organisms to grow beyond a period of five days.

After the fermentation process, the composition obtained has the basic cheesy flavor as described above, except when the organisms mentioned above in connection with a chedder cheese flavor are used as the inoculant. In this latter case the composition obtained has a definite cheddar cheese flavor as well as the basic cheesy flavor.

After the organisms have been allowed to grow as disclosed above, the product obtained thereby may be used in any desired way for providing the cheese flavor. For example, the product may be concentrated to produce a high degree and distinctiveness of cheddar flavor, when the organisms noted above in connection with the cheddar cheese flavor are used as the inoculant, or it may be pasteurized and dried as a cheese flavored powder or it may be used to mix with an unaged cheese base or aged cheese to make a flavored cheese or cheese product of excellent quality and taste.

As an alternate to the above procedure, instead of sealing the medium in an airtight condition, the fermentation may take place in a container wherein the head space is continually flushed with an inert gas such as nitrogen and the like. The flush of nitrogen or the use of a sealed container is necessary to the present invention since the process must be carried out under microaerophilic conditions. The establishment of microaerophillic conditions is well within the skill of the art and no further details are considered necessary.

The inoculant used in the above procedure may be prepared in a similar manner. The medium, e.g., skim milk, is heated to the above-noted temperatures and times for the same purpose and inoculated with at least one organism from the genus Bacillus and at least one organism from the genus Streptococcus in the minimum amounts and at the range of ratios noted above. The temperature of the inoculated medium is maintained at the same temperatures noted above. However, in producing the inoculant, the growth of the organisms must be continued until a symbiotic relationship is established. This time can vary depending upon the particular organisms of the genera which are actually used and upon the care and control exercised in the growth process. However, under usual conditions and care, especially with the organisms for producing a cheddar cheese flavor, the symbiotic relationship will usually be established in 25 to 35 days. However, shorter or longer periods may be used and the exact time is not critical so long as a symbiotic relationship is established. Once the symbiotic relationship is established, the medium is then suitable for inoculating large batches of milk or other mediums containing the protein and carbohydrate for producing cheese or the cheese flavors, as desired.

As noted above, the medium which has been inoculated and maintained at the above-noted temperatures for three to five days may be used to produce any desired end product having a cheese flavor. For example, a non-aged cheese base, milk solids, fats, whey solids or other desired edible bases may be simply mixed with the flavor produced and dried or packaged as desired to produce a cheese flavored product or cheese. Optionally, salt, dispersing agents, stabilizers, preservatives and coloring agents may be added as desired and as is well known to the art. Furthermore, edible extenders or diluents may be used.

It is an important feature of this invention that the cheese flavor produced may be mixed with natural cheeses or synthetic cheese flavors to produce a highly flavored cheese or cheese flavored product. In this regard, it is quite unexpected that the composition of the invention so enhances and magnifies the flavor of natural cheeses or synthetic cheese flavors that a mixture of a natural cheese or synthetic cheese and the present composition gives a highly flavored product, although the amount of natural cheese or synthetic cheese flavor in the mixture may be as low as 3% of the mixture, e.g. 5% especially 6% or more of the mixture. For example, 6% (on a solids basis) of natural cheddar cheese may be added to 94% of the present composition to produce a highly flavored cheddar cheese product. This product may be compounded as a solid, liquid, or in a dried form, e.g. by spray drying. Also, for example, 50% (on a solids basis) of natural blue cheese and 50% of the present composition may be combined to give a highly flavored blue cheese product, which again, may be made into a liquid, solid or powdered product. As is quite apparent from the above, while the mixtures of natural cheese and the present composition give highly flavored products, the resulting cost of these mixtures is considerably lower than the cost of similar products flavored with the natural cheeses. Instead of mixing the present composition with cheddar cheese or blue cheese, as described above, the composition may be mixed with Swiss cheese, Romano cheese, Parmesan cheese, other Italian cheeses, Limburger cheese, etc., in fact, any desired natural cheese.

While any member of the genus Bacillus and genus Streptococcus may be used according to the present invention, it is to be clearly understood that at least one member of these two genera must be used in combination in order to produce the cheese flavor. Also as noted above the degree and distinctiveness of the cheese flavor produced will vary depending upon the particular organisms chosen especially when it is desired to produce a cheddar flavor. This is a valuable feature of the invention since any desired degree and distinctiveness of the cheese flavor may be obtained from a very mild to a very strong cheesy flavor. Usually, however, a strong cheesy flavor will be desired since the strong flavors may be diluted in any way desired, as noted above, to produce the degree and distinctiveness of the cheese flavor in the finished product. In this latter regard, the organisms noted above in connection with producing a cheddar cheese flavor along with the basic cheesy flavor will produce a very strong flavor. Accordingly, the invention will be illustrated in terms of the organisms which produce the cheddar cheese flavor; however, it is to be clearly understood that the invention is fully applicable to the extent of the foregoing disclosure and it is not limited to the specific embodiments of the examples which are merely drawn to some of the best modes of the invention.

EXAMPLE 1

Production of the inoculant

Skim milk having 22% total solids was heated to 145° F. for 30 minutes to substantially destroy any pathogens and to reduce the number of competitive organisms. The skim milk was then cooled to 100° F. and placed in a sterile container having ¼ of its volume as a head space. The container was placed in an isothermal bath maintained at 100° F. The cooled skim milk was inoculated with 3000 organisms per gram of the medium of the organism *S. lactis-diacetilactis* (citrate fermenter) and 3000 organisms per gram of the medium of the organism *S. lactis-diacetilactis* (citrate non-ferementer). The skim milk was also inoculated with 2000 organisms per gram of aqueous medium of *B. megaterium* and 2000 organisms per gram of the medium of *B. megatherium*. The inoculated skim milk was maintained at 100° F. for thirty days during which a symbiotic relationship of the organisms therein was established. The product was then suitable as an inoculant for producing a cheese flavor or a cheese flavored product.

EXAMPLE 2

Production of the cheese flavor

Skim milk having 15% total solids was heated to 145° F. for thirty minutes to substantially destroy pathogens and to reduce the number of competitive organisms. The skim milk was cooled to 100° F. and placed in an isothermal bath maintained at 100° F. The skim milk was then inoculated with the product of Example 1 wherein the resulting inoculated skim milk had a total of 10,000 organisms per gram of skim milk and a ratio of the Bacillus organism to the Streptococcus organisms was approximately 60/40. The inoculated skim milk was stirred for 35 minutes to disperse the organisms therein. The inoculated skim milk was then sealed in an airtight container having ⅓ of its volume as a head space and allowed to remain at 100° F. for five days during which the skim milk was fermented and gases were contained in the head space. Thereafter, the container was opened and the pressurized gases in the head space and the liquid medium were allowed to escape. This product was then suitable for further processing into a finished consumable cheese-flavored product.

EXAMPLE 3

Process of making consumable product

On a dry basis was mixed 50% fermented solids of Example 2, 31.3% acid whey powder, 4% salt, 5% disodium phosphate (a dispersing agent), .5% USDA Yellow No. 5, the remainder being dry milk solids. After thorough mixing, a portion thereof was dispersed with vigorous stirring in water and spray dried to form a cheese powder. The cheese powder was a fine textured powder having a very distinctive and medium degree of cheese flavor.

EXAMPLE 4

A second portion of the product of Example 3 was mixed with an equal portion by weight of milk solids and produced a cheese spread of mild cheese flavor.

EXAMPLE 5

A third portion of the product of Example 3 was mixed with an equal portion of vegetable fats and produced a mild cheese dip.

EXAMPLE 6

Equal portions of the product of Example 3 and whey solids were mixed to produce the medium mild cheese flavored powder for sprinkling on salads and the like.

EXAMPLE 7

On a dry weight basis, there was mixed 50% of the fermented solids of Example 3, 6% aged cheddar cheese, 16.3% acid whey powder, 15% butter fat, .5% atmos 150 (monoglyceride emulsifier) and the remainder being salt, disodium phosphate and USDA Yellow No. 5. This product after being thoroughly mixed was cut into wedges and produced an excellent cheddar cheese.

Of course, the cheese flavor of the present invention may be mixed with any desired edible base including natural cheeses, as noted above. Hence, natural cheddar cheese may be mixed with the present cheese flavor to give a more intense cheddar flavor. Also other cheeses, e.g. blue cheese, may be mixed with the present cheese flavor to give a blue cheese taste. Also, the present cheese flavor may be mixed with ferments, such as those disclosed in copending application Ser. No. 743,050, which disclosure is incorporated herein by reference.

EXAMPLE 8

The procedure of Example 2 was repeated except the organisms used in the inoculant were *Streptococcus thermophilus* and *Bacillus stereothermophilus*. The product produced had a very distinct cheesy flavor but was not particular to any specific cheese such as blue cheese or cheddar cheese.

EXAMPLE 9

The procedure of Example 2 was repeated except that the organisms used in the inoculant were *Bacillus cereus* and *Streptococcus cremoris*. The product produced was quite similar to the product of Example 8.

EXAMPLE 10

The procedure of Example 2 was repeated except that the organisms used in the inoculant were *Bacillus subtilis* and *Streptococcus faecalis*. The product produced was quite similar to the product of Example 8.

EXAMPLE 11

The procedure of Example 7 was repeated except that the product of Example 8 was used rather than the fermented solids of Example 3. The product obtained had a very distinct cheddar cheese flavor.

EXAMPLE 12

The procedure of Example 7 was repeated except that the product of Example 9 was used instead of the fermented solids of Example 3. A mild cheddar cheese flavored product was obtained.

EXAMPLE 13

The procedure of Example 7 was repeated except that the product of Example 10 was used instead of the fermented solids of Example 3. A mild cheddar cheese flavored product was obtained.

What is claimed is:

1. A cheese flavor composition comprising a pasteurized aqueous medium, containing the growth products of a combination of microorganisms, said medium having at least one protein and at least one carbohydrate therein and containing a symbiotic combination consisting essentially of at least 10 organisms per gram of the medium of at least one first non-toxic member selected from the genus Bacillus and at least 10 organisms per gram of the medium of at least one second non-toxic member selected from the genus Streptococcus Group II, the Enterococcus group of Group II, and Group IV.

2. The composition of claim 1 wherein the said first member is both *Bacillus megaterium* and *Bacillus megatherium* and the said second member is both *Streptococcus lactis* variation *diacetilactis* (citrate fermenter) and *S. lactis* variation *diacetilactis* (citrate non-fermenter).

3. The composition of claim 1 having at least 10,000 organisms per gram of each member.

4. The composition of claim 1 in a dried cheese flavor form.

5. The composition of claim 1 wherein said first member is selected from the group consisting of *Bacillus alvei, cereus, cereus* var. *mycoides, megaterium, megatherium, subtilis, subtilis* var. *aterrimus* and *subtilis* var. *niger*.

6. The composition of claim 5 wherein said second member is selected from the group consisting of *Streptococcus cremoris, durans, faecalis* and *lactis*.

7. The composition of claim 1 wherein the said aqueous medium is at least in part a milk product.

8. The composition of claim 7 wherein the milk product is selected from whole milk, skim milk and milk solids.

9. The composition of claim 8 wherein the milk product is skim milk.

10. A process for producing a cheese flavor comprising pasteurizing an aqueous medium containing a protein and a carbohydrate, inoculating the pasteurized aqueous medium with a combination consisting essentially of at least 10 non-toxic organisms per gram of medium of the genus Bacillus and at least 10 non-toxic organisms per gram of medium of the genus Streptococcus Group II, the Enterococcus group of Group III, and Group IV, and growing the combination of organisms until a symbiotic relationship of the organisms is established and a cheese flavor develops.

11. The process of claim 10 wherein the aqueous medium is pasteurized at a temperature of at least 145° F., for 30 minutes and the pasteurized medium is cooled to between 130° F. and 60° F. prior to said inoculating step.

12. The process of claim 10 wherein the ratio of the organism of the genus Bacillus to the organisms of the genus Streptococcus is between 25:75 to 75:25, respectively.

13. The process of claim 10 wherein after the inoculation step, the medium is kept in an airtight container at 60° F. to 130° F.

14. The process of claim 10 wherein the organisms are grown at temperatures between 85° F. and 130° F.

15. The process according to claim 10 wherein the medium is pasteurized after the cheese flavor develops.

16. A process according to claim 10 wherein the said aqueous medium is at least in part a milk product.

17. The process of claim 16 wherein the medium contains from 4% to 35% total solids.

18. The process of claim 16 wherein the milk product is selected from whole milk, skim milk and milk solids.

19. The process of claim 18 wherein the milk product is skim milk.

20. The process of claim 10 wherein a part of the said ferment with the symbiotic relationship is added to a pasteurized medium containing a protein and a carbohydrate and allowed to ferment to produce cheese flavor.

21. The process of claim 20 wherein the said first member is both *Bacillus megaterium* and *Bacillus megatherium* and the said second member is both *Streptococcus lactis* variation *diacetilactis* (citrate fermenter) and *S. lactis* variation *diacetilactis* (citrate non-fermenter).

22. The process of claim 20 wherein the medium is allowed to ferment for up to 5 days.

23. The process of claim 22 wherein the medium is allowed to ferment for about 3 to 5 days.

24. The process of claim 20 wherein the said first member is selected from the group consisting of *Bacillus alvei, cereus, cereus* var. *mycoides, megaterium, megatherium, subtils, subtilis* var. *aterrimus* and *subtilis* var. *niger*.

25. The process of claim 24 wherein said second member is selected from the group consisting of *Steptococcus cremoris, durans, faecalis* and *lactis*.

26. The process of claim 25 wherein the pasteurized medium is cooled to a temperature between 60° and 130° F. and subsequently inoculated with the said combination of organisms and grown at said temperature ranges.

27. The process of claim 26 wherein the temperature range is 85° F. to 130° F.

28. The composition of claim 20 in admixture with an edible base.

29. The composition of claim 28 wherein the edible base is a natural cheese, milk or milk fraction, fat or synthetic cheese flavor.

30. The composition of claim 29 wherein the edible base is a natural cheese.

31. The composition of claim 30 in a dried form.

32. The composition of claim 30 wherein the natural cheese is cheddar cheese, blue cheese, Roquefort cheese, Swiss cheese, Italian cheese.

33. The composition of claim 32 in a dried form.

34. The composition of claim 32 wherein the cheese is cheddar cheese.

References Cited

UNITED STATES PATENTS

| | | | |
|---|---|---|---|
| 2,805,950 | 9/1957 | Erekson | 99—116 |
| 3,365,303 | 1/1968 | Hedrick | 99—116 |
| 3,483,087 | 12/1969 | Christensen | 195—96 |
| 3,507,750 | 4/1970 | Murray | 99—116 X |

JOSEPH SCOVRONEK, Primary Examiner

S. MARANTZ, Assistant Examiner

U.S. Cl. X.R.

99—115, 116; 195—96